COLLIMATED DUOPLASMATRON-POWERED DEPOSITION APPARATUS

Filed March 14, 1966 3 Sheets-Sheet 1

Michael Doctoroff INVENTOR
BY
Wolf, Greenfield + Hieken

INVENTOR
Michael Doctoroff
BY
Wolf, Greenfield & Hieken

Feb. 10, 1970 M. DOCTOROFF 3,494,852

COLLIMATED DUOPLASMATRON-POWERED DEPOSITION APPARATUS

Filed March 14, 1966 3 Sheets-Sheet 3

Michael Doctoroff INVENTOR

BY

Wolf, Greenfield & Hieken 3,494,852

COLLIMATED DUOPLASMATRON-POWERED DEPOSITION APPARATUS

Michael Doctoroff, Framingham, Mass., assignor, by mesne assignments, to Whittaker Corporation, Los Angeles, Calif., a corporation of California Filed Mar. 14, 1966, Ser. No. 534,995
Int. Cl. B01k *1/00;* C23c *15/00*
U.S. Cl. 204—298 4 Claims

ABSTRACT OF THE DISCLOSURE

An apparatus for depositing material from an electrostatically focused ion beam where means are provided in the first or high pressure chamber of a duoplasmatron to move solid coating material into contact with the arc discharge. An electrostatic means focuses an ion beam formed by the arc discharge as the beam is emitted from the duoplasmatron whereby areas on a substrate exposed through a mask become coated.

The present invention relates to a method and apparatus for thin film deposition.

Thin film deposition has been attempted by a variety of techniques that involve the use of a substrate which is elevated to or maintained at a relatively high temperature. This high substrate temperature has been considered necessary during the deposition of a thin film for the purpose of increasing the mobility of the atoms being deposited. This increased mobility allows these atoms to migrate to sites of maximum coordination number. Improved crystallization yields of high density deposits have been attained by these high temperatures. In fact, the most successful thin film techniques in use employ substrates of ceramic or other high temperature material maintained at relatively high temperatures.

However, forming thin films with substrates maintained at high temperatures has certain disadvantages which limit the utility of these techniques. The principal disadvantage of these known techniques is that undesirable chemical reactions may occur when the substrate is maintained at high temperatures. These reactions include, for example, alloying with the substrate, and alloying reactions between components in multilayered depositions. Because of these and other disadvantages, thin film techniques cannot be used with a number of compositions, and thereby materials available for thin film depositions by known techniques are severely limited.

Among these various techniques which have been used those commonly known include the epitaxial technique, a molten substrate technique, a sputtering technique, and flash-evaporation techniques. The most commonly used technique for obtaining crystalline deposits is the epitaxial approach which requires high substrate temperatures, ordinarily in the order of magnitude of 1100 degrees centigrade. It also requires a crystal surface on which the deposition is produced. Similarly, the molten substrate technique requires high substrate temperatures, but, in addition, the likelihood of a proper deposition of a film is in large measure dependent upon chance because of the random movement of the molten portion of the substrate. Very high vacuum systems are also required for films of extreme purity. Thus, for these and other reasons, none of the existing techniques are ideal.

It is an object of the present invention to provide an improved method and means for deposition of thin films at relatively low substrate temperatures on a variety of substrates, which method and means are particularly adapted for use in fabricating microelectronic or optical components with an economy not heretofore possible. A further object of this invention is to provide a method for fabricating a thin film-substrate composition having better thin film adherence than heretofore possible. A further object of this invention is to provide a thin film-substrate composition having an improved molecular structure. Another object of this invention is to provide an improved method of depositing a uniform thin film on a substrate at a relatively rapid rate and in a highly reproducible fashion. One further object of this invention is to provide an improved method of depositing thin films at a low substrate temperature so that alloying of different materials does not occur, and so that photoresist masking may be employed.

A further object of this invention is to provide an improved method of depositing a thin film of material which employs an ionized beam of high-energy ions in a path directed toward a substrate.

In the present invention, there is provided a method in which a thin film is formed on a substrate by ionizing and electrostatically accelerating in a first direction a beam of atomic particles of material which are to be deposited as a thin film. This beam of atomic particles is directed at an obtuse angle to a substrate surface so that migration of the atomic particles to optimum lattice positions may occur. The ions are substantially accelerated to high-energy levels so that deposits held by weak binding energy on the substrate may be sputtered away, thereby increasing the adhesive and cohesive forces of the deposited particles on the substrate surface. The invention also contemplates the utilization of a method and means in which the ionized and electrostatically accelerated beam of atomic particles are projected through a masking means which limit the area on the substrate which is exposed at a given time to said beam whereby the nucleation source is specifically controlled.

The present invention also provides an improved structure for effecting this method.

These and other objects and advantages of the present invention will be more clearly understood when considered in conjunction with the accompanying drawings in which.

Figure 1:
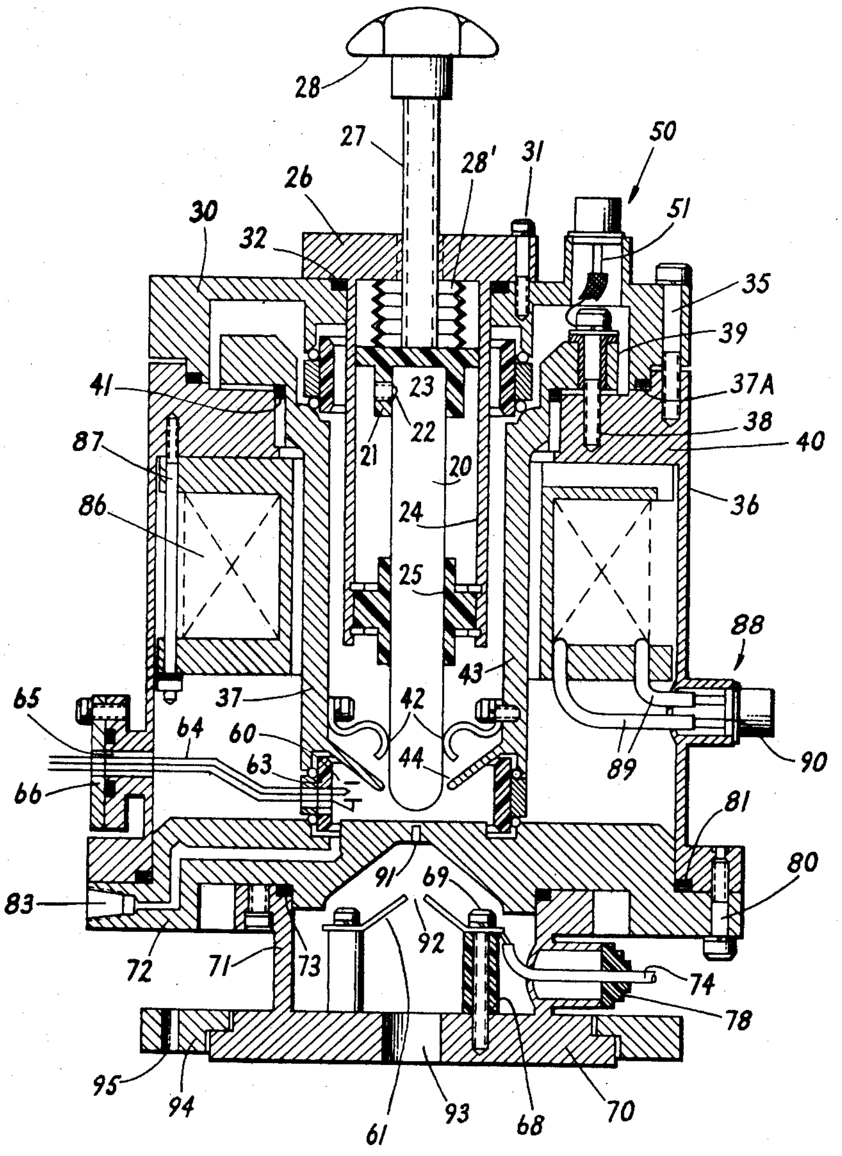
FIG. 1 is a cross-sectional, vertical elevation of a modified duoplasmatron useful in generating a beam of ionized and electrostatically accelerated atomic particles.

In the present invention, atomic or molecular particles from an evaporant material are ionized and electrostatically accelerated in a beam extending in a first direction. A substrate material is positioned with a surface preferably at an obtuse angle to the first direction of the beam. The substrate surface and beam are moved relative to one another with limited portions of the substrate being exposed to the incident beam at one time so as to program the distribution of available nucleation sites, whereby the substrate surface area exposed to the incident beam is confined at any given time.

The atomic particles from the evaporant material must be ionized and electrostatically accelerated in a beam that has sufficient energy to permit the atomic particles in the beam to migrate to sites of maximum coordination numbers on impinging the substrate surface. Atomic particles with high kinetic energy have a tendency to sputter away deposits which are weakly held so that only atoms with strong binding energies remain thereby assuring stronger adhesion of the film to the substrate. In addition, a beam having a high kinetic energy content can be oriented so that there is more time for the evaporant to migrate on the substrate before the deposit settles in its final position. Depositing the atomic particles at a grazing incidence as, for example, at an angle of 150 degrees significantly increases the atomic mobility and thereby the likelihood of better adherence. Thus, typical granular structures which are associated with non-normal depositions are avoided as the incident atomic particles have enough energy to sputter off any surface irregularities where weak-binding energies exist. Because of the high surface mobility of the incident ions, the film grows as if it were drawn from a two-dimension liquid film.

A wide variety of evaporant and substrate materials may be utilized. Thus, non-conductor, conductor, and semi-conductor evaporant materials are suitable. The substrate materials may comprise conventional ceramic substrates as well as other non-conductor substrates or, alternately, semi-conductor or conductor substrates. The particular substrate material as well as the evaporant material will, of course, depend upon the specific application for which the composition is being developed.

Typical of the substrates which might be used are alumina, quartz, sapphire or polished metal slabs of both conductors and semi-conductors. For resistors, the deposited beam might be of Nichrome composition, or alternatively, mixtures of metals and ceramics or of oxides of metals such as titanium or titanium and alumina. For dielectric layers, titanium dioxide, silicon monoxide or barium titanate are typical of the materials which might be deposited. These might be formed either by reactive evaporation within the duoplasmatron unit or by direct evaporation from a dielectric rod. Semi-conductor films of materials, such as silicon or germanium, might also be formed in this way.

Particular parameters of the ionized and electrostatically accelerated beam as well as other parameters of this process may be varied. Preferably, the beam should consist of one hundred percent ionized and electrostatically accelerated atomic particles. The beam preferably should be focused to a relatively small spot as, for example, a spot having a diameter in the order of magnitude of .10 cm. for relatively rapid deposition.

It is also important to confine the area on the substrate onto which the beam is directed at a given time Any suitable method may be utilized including the use of a moving shutter or other limiting means. By limiting the area of the substrate exposed at a given time to the beam, grain boundaries are reduced. This may be attained, for example, by a moving wedge having an aperture with a dimension narrower than the dimension of the beam.

The duoplasmatron 7 may be of any design which is capable of generating a beam of electrostatically accelerated ions having the parameters referred to above. One suitable form of this duoplasmatron is illustrated in FIGURE 1. This exemplary duoplasmatron has a power consumption in the order of 10 kilowatts with potential capabilities as high as minus 20 kv. It has a capacity of a deliverable ion current in the order of magnitude of 100 milliamps or about $10^{18}$ ions per second. The ion beam generated by this duoplasmatron can be focused by a magnetic lens to a beam diameter of 0.10 centimeter which would result in an evaporation rate of at least $10^{20}$ particles/second. For aluminum, this would be the equivalent to an evaporation rate of about $10^4$ Angstroms/second. Preferably, the deposition rate should exceed 5000 Angstroms/second. The magnetic field is in the order of 700 gauss across the gap which would be generated by 2 amps through 1000 turns of copper wire. The evaporant material 20 in the embodiment illustrated, comprises a rod of metal material. Some modifications of the duoplasmatron from the embodiment illustrated in FIGURE 1 would be required if other than a metal evaporant material were being utilized. This rod 20 is secured in a recess formed by an annular wall 21 of a holder 23 by a setscrew or other like means 22. The holder 23 is vertically adjustable in a cylindrical sleeve 24. The lower end of the evaporant rod 20 extends through a bearing 25 in turn rigidly secured to the lower end of the sleeve 24. The bearing 25 as well as the holder 23 are formed of dielectric materials with a relatively high thermal conductivity. The upper end of the annular sleeve 24 is integrally connected to a cap 26. An adjusting plunger 27 extends through a hole in this cap 26 and is rigidly connected at its lower end to the holder 23. A handle or knob 28 is secured at the upper end of this rod 27. The hole in the cap 26 in which rod 27 passes and is journaled is suitably sealed by a bellows 28' connected at its upper end to the lower surface of the cap 26 and at its lower surface to the upper surface of the holder 23. If desired, automatic feed means (not shown) may be connected to plunger 27 for raising and lowering the evaporant rod 20. The cap 26 is in turn secured to a cover 30 by suitable means such as radially arranged screws 31 (only one being shown in FIGURE 1). A relatively tight seal between these elements is formed by gasketing 32 which extends annularly about the opening in the cover 30 through which sleeve 24 projects. The cover 30 is in turn secured by suitable means such as screws 35 radially disposed about the cover (only one being shown in FIGURE 1), to an outer cylindrical jacket 36. A suitable gasketing 37A having an annular configuration is positioned between the cover and jacket to assure a tight gaseous seal. The outer jacket 36 surrounds an inner jacket 37 with the inner jacket being secured to the outer jacket by suitable means such as screws 38, extending downwardly through an outwardly extending flange of the inner jacket into an inwardly extending flange 40 of the outer jacket. A suitable gasketing 41 may be used to insulate the connection between these jackets.

The inner jacket has a plurality of conductive spring fingers 42 bolted or otherwise secured to its inner surface 43 at its lower end with the spring fingers resiliently engaging the lower end of the evaporant rod 20. Positioned just below these spring fingers 42, is an annular bias electrode 44 in the form of an inwardly flared flange integral at its outer edge with the inner wall of the inner jacket 37. This bias electrode 44 is normally maintained at a negative voltage as, for example, minus 50 volts, by a connection 50 to a negative potential. This connection 50 includes a cable terminal 51 extending through a suitable aperture in the cover 30 and connected through a spring contact (not shown) 30 to the inner jacket. Bias electrode 44 is in turn electrically connected to this inner jacket 39.

A filament cathode electrode 60 is positioned at 90 degrees with respect to the longitudinal alignment of the rod 20 and an extractor electrode 61. This filament cathode electrode 60 is positioned in transverse alignment with the tip of the rod 20 below the lower edge of the inner jacket 37. This filament cathode is suitably supported at its inner end by an insulating annular ring 63 with the electrode extending suitably through an aperture in this ring. The electrode is connected to a suitable negative voltage source as, for example, minus 200 volts, by a cable 64 which extends through a port 65 in the outer jacket 36. The wire 64 may be suitably supported by an insulating ring positioned in an aperture of plate 66 which covers port 65. This cathode is designed to supply a quantity of electrons so that an arc may be maintained between the bias and anode electrodes. In fact, any physical arrangement which can assure the flow of a large number of electrons to the anode-bias gap may be used. The arrangement described herein is a simple and effective means for attaining such flow. When an evaporant material of conducting metal is used, however, a filament cathode electrode is not required. The extractor electrode 61 comprises an upwardly beveled disc having an aperture at its center with the aperture vertically aligned with the rod 20. The periphery of this disc is insulated from and secured on annular insulating collars 68 in turn secured by screws 69 or the like to the supporting plate 70. Supporting plate 70 is in turn integrally secured by sidewalls 71 to the bottom 72 by suitable means such as screws. Bottom 72 in part forms an anode. Suitable gasketing means 73 may be used to assure a gaseous-type seal. The extractor electrode may be maintained at a negative voltage in the order, for example, of minus 1 kv., from a power source connected to the electrode through the cable 74. The cable 74 extends through the wall 71 and is insulated from it by a suitable insulating material or gasket 78. The bottom 72 is suitably secured to the outer jacket by bolts 80 or the like in an insulating seal which may be maintained by insulating gaskets 81. A gas passage or inlet 83 is connected at one end to the chamber within which the rod 20 is positioned and its other end is provided with a suitable connecting member or nipple for engagement with a gas supply. The gas that may be used and introduced into this duoplasmatron depends upon the particular use for which it is intended. For example, if aluminum film is being deposited from an aluminum rod 20, one could normally use argon. If aluminum oxide is going to be deposited in a thin film, one would normally use oxygen or oxygen argon combination.

A magnet is conventionally positioned intermediate the inner jacket 37 and outer jacket 36. This magnet 86 is suitably secured to the outer jacket 38 by bolts 87 or the like. Electrical connections to the magnet are made through the outer jacket wall at 88 with the cables 89 to the magnet extending through a terminal block 90.

An aperture 91 is aligned with the aperture 92 in the extractor electrode and with the aperture 93 in supporting plate 70. These apertures are vertically aligned with the target area onto which the beam or ions are directed. A retaining ring 94 having bolt holes 95 is provided to secure this duoplasmatron to the top wall 3 with retaining ring 94 having an inwardly extending flange adapted to engage a shoulder on the periphery of supporting plate 70.

This duoplasmatron provides, therefore, a three-electrode arrangement with the electrode between the cathode and anode having an aperture which concentrates the arc to a small region near the extractor hole or aperture 91 drilled in the anode formed by the cover 72. A magnetic mirror field in the small region of high ion density is added to the basic discharge. This mirror field acts to reflex the electrons so that escape is possible only very near the source axis. This magnetic field action causes the arc to draw down to a very small conical envelope coming to a point at the anode. At the point of the arc-tip, ion density of $6 \times 10^{14}$ ions/cm.$^3$ occur. This value could be compared with ion densities of $10^{11}$ ions/cm.$^3$ usually found in high intensity RF ion sources. No attempt is made to force ions through the exit apertures 91 since such an attempt would only cause the ions and electrons to be separated and space charge repulsion among the ions would seriously limit the extractable current. The exit aperture 91 merely acts as an ion electron leak, and with the large ion densities available, this aperture 91 can be quite small. The small size of the aperture 91 plus the fact that the gas is almost totally ionized both contribute to the high gas efficiency of this device. The plasma boundary and the beam admitted from the boundary are located in a high vacuum arrangement where very large extraction gradients may be utilized to control and accelerate the particles.

Figure 5:
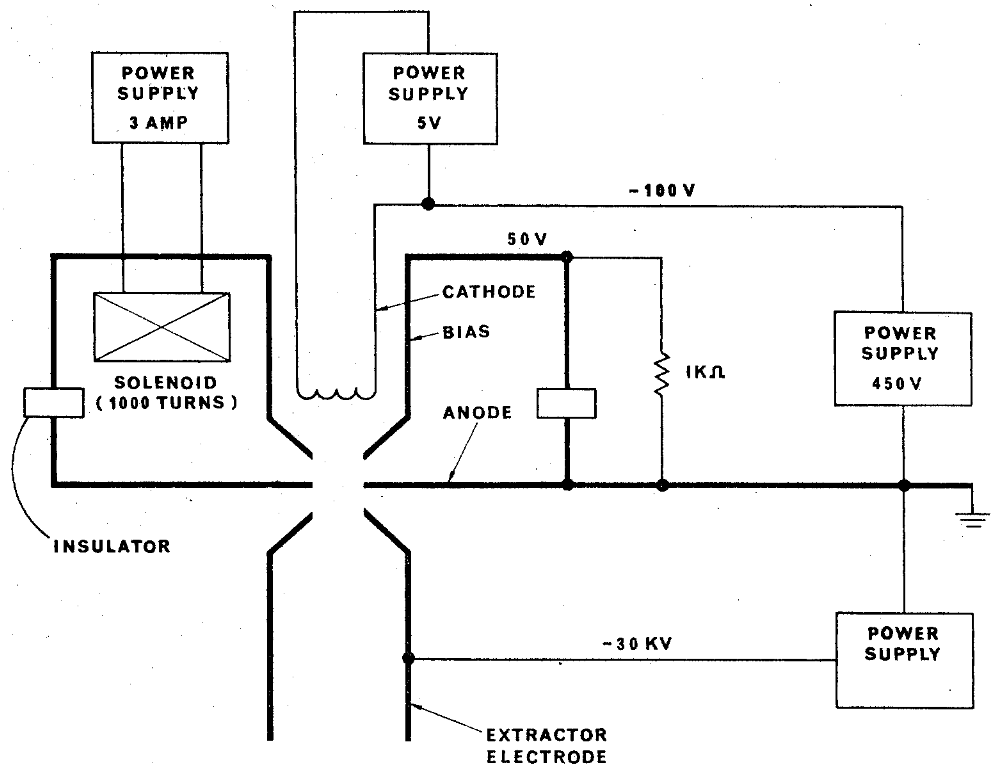
FIG. 5 is a schematic view of a circuit used in connection with the apparatus described herein.

FIGURE 5 illustrates a schematic arrangement of the duoplasmatron. In this diagram, each of the critical components is identified and the potentials attached to each of the electrodes is illustrative of a suitable arrangement.

When the evaporant is a conducting metal, the use of a filament cathode is not required. In order to initiate an arc, the evaporant can be moved manually, so that it contacts the anode and then can be retracted once the arc is initiated. The arc will then maintain itself.

The problem becomes more severe when a non-conductor is being used as an evaporant. In this case contact between the anode and sample will not achieve any results in starting of the arc. The operation of the filament cathode provides conduction along the surface of the insulator. By this method an arc can be initiated. Once initiation has occurred, the arc will sustain itself by secondary emission. The physical mechanisms involved are similar to the mechanisms which occur when an insulator is evaporated by electron-beam heating. In this case, it would normally be expected that the build-up of electrons in the non-conductor would limit the time that the electrons could effectively provide energy to the evaporant. However, secondary electron emission is the mechanism for charge removal, and continuous evaporation of electrical insulators is possible with electron beams. The same condition exists with arc evaporation.

Figures 2, 3, 4:
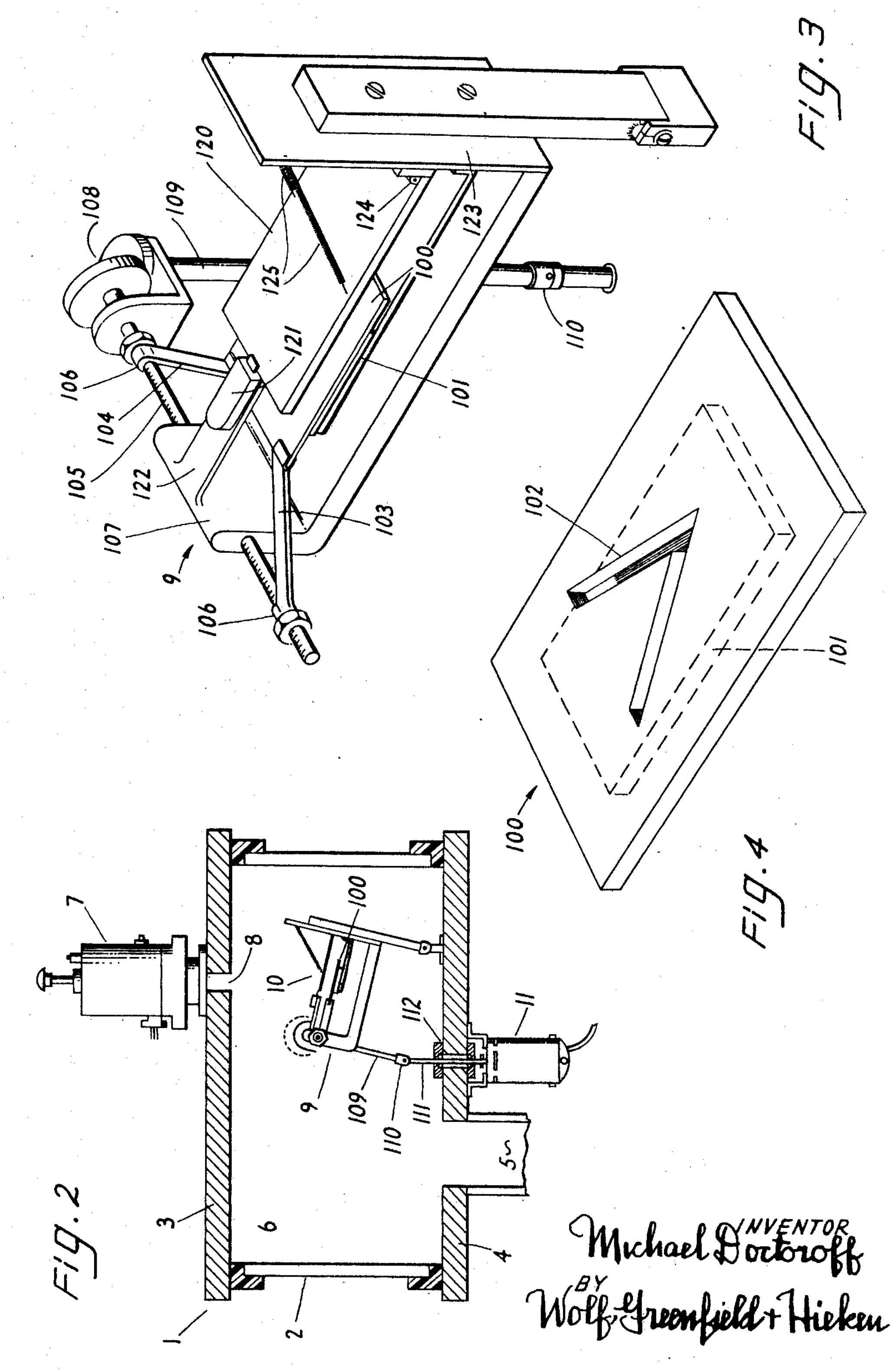
FIG. 2 is a somewhat schematic cross-sectional elevation of the overall mechanism, utilizing the modified duoplasmatron of FIG. 1 and a supporting mechanism for a substrate onto which the duoplasmatron focuses a beam of atomic particles.
FIG. 3 is an enlarged perspective view of the structure supporting the substrate material in the path of the beam generated by the duoplasmatron.
FIG. 4 is an enlarged perspective view of a wedge configuration supported on the supporting structure illustrated in FIG. 3.

The moving wedge 100, illustrated in FIGURE 4, is used to control the introduction of nucleation sites. This wedge is allowed to move slowly across the substrate surface continuously exposing a new boundary at which nucleation can occur. In this way, the nucleation sites are controlled. Some of the randomness of deposition which would occur without the use of the moving wedge is thereby eliminated and high density films can be assured. The wedge must be positioned with its lower surface close to the upper surface of the substrate indicated at 101. This proximate of the moving wedge to the substrate is critical because if the wedge is not close to the substrate, deposition will occur under the edge of the wedge aperture 102. This would be most pronounced when non-normal depositions are employed. Moreover, deposition under the wedge aperture would be of a different energy level from the balance of the ion beam at the point at which it strikes the substrate and, consequently, the results of the thin film deposition would not be uniform.

The wedge 100 is positioned in the chamber 6 and is supported for actuation on the driver mechanism 9. One edge of the wedge 100 is rigidly secured by struts 103 and 104 to a lead screw 105. These struts 103 and 104 are provided with journals internally threaded at 106 for longitudinal movement of the struts on the lead screw as it rotates. This movement causes the wedge 100 to move laterally with respect to the driver mechanism 9. The lead screw 105 is journaled in bracket 107 and is connected at one end through gears 108 to drive shaft 109. Drive shaft 109 in turn is connected through a universal link 110 to a lower shaft 111 which extends through a double O-ring seal 112 in a lower wall to a variable speed motor 11 located outside of the chamber 6. This lead screw system provides a smooth driving mechanism. Preferably, this system should be provided with a built-in stop to allow exact indexing of the substrate with respect to the wedge.

The wedge opening is preferably shaped like the two legs of an isoceles triangle. The back edge of the wedge is displaced from the front by a constant distance which provides a technique for uniformly depositing on the substrate, and for beginning deposition at a point rather than over a broad area.

It is important that the wedge be moved at a very constant but variable speed. The variable speed control permits a selection of optimum wedge velocity as a function of evaporation rate and other parameters.

In addition to the wedge, there is provided a shutter and zero indexing mechanism. The shutter indicated at 120 is designed to prevent deposition during outgassing and the zero-indicating system is developed to limit the loss of the evaporant and to assure that the deposition begin at the intended location of the substrate. The shutter 120 is activated when the motor drive to the screw mechanism is turned on. In this way, the shutter is removed from the substrate at the same time that the mechanism is turned on and after the duoplasmatron has been in operation for some time. The shutter 120 is a hinged mechanism which is held in place with an electromagnetic latch 121. This electromagnetic latch 121 is supported on an arm 122 in turn secured to the bracket 107. The shutter 120 is supported on the frame extension 123 and is secured to it by hinges 124. The shutter 120 is normally tensioned upwardly by springs 125. After the latch 121 is retracted electromagnetically, the shutter 120 is pivoted upwardly under the tension of spring 125. The motor then begins to move the wedge over the substrate. The substrate temperature is preferably in the order of magnitude of 100 degrees centigrade. At such temperatures, a suitable photoresist masking technique may be utilized.

In this arrangement, the duoplasmatron ion beam is arranged so that the ion beam strikes the substrate at an angle of approximately 150 degrees. This angle is empirically optimized to alow the ion to maintain its energy while it seeks the best nucleation site. If an angle of 90 degrees between the substrate and the ion beam were used, all of the energy might be absorbed by the substrate and the ion beam buried at the point of contact. This may not allow for freedom for selection of nucleation sites which is intended.

What is claimed is:

1. In an ion beam coating apparatus wherein the coating material is supplied to an electric discharge as a solid material adapted to vaporize in said discharge, including a first chamber, a second chamber, wall means between said chambers having a restricted aperture providing gaseous communication between said chambers, an electron emissive cathode in said first chamber, an anode in said second chamber, means to connect said aode and said cathode to an electrical power source causing an arc discharge to be struck from said cathode in said first chamber through said aperture and to said anode in said second chamber, magnetic means to focus said arc through said aperture and means to provide a pressure differential between said chamber and across said wall so that said apparatus functions as a duoplasmatron; the improvement wherein said first chamber is provided with means to support and move said solid material into said arc as the solid material becomes vaporized by said arc and means to bias electrically said solid material, whereby the material being vaporized becomes at least partially ionized to form said ion beam and moves with said arc into the second chamber and past said anode.

2. The apparatus as set forth in claim 1 including means for electrostatically focusing said ion beam.

3. The apparatus as set forth in claim 1 including elements for movably supporting a substrate in the path of said ion beam for deposition of said material thereon.

4. The apparatus of claim 3 wherein said elements movably supporting the substrate includes a mask having an aperture therein for limiting deposition of material on said substrate.

References Cited

UNITED STATES PATENTS

| | | | |
|---|---|---|---|
| 2,934,665 | 4/1960 | Ziegler | 313—63 |
| 2,982,845 | 5/1961 | Yenni et al. | 219—76 |
| 3,016,447 | 1/1962 | Gage et al. | 219—76 |

ROBERT K. M. HALEK, Primary Examiner

U.S. Cl. X.R.

117—93.1; 204—192, 311, 325; 219—76; 313—63